Feb. 14, 1956  C. O. WOOD  2,734,328
LAWN MOWER
Filed March 10, 1953  2 Sheets-Sheet 2
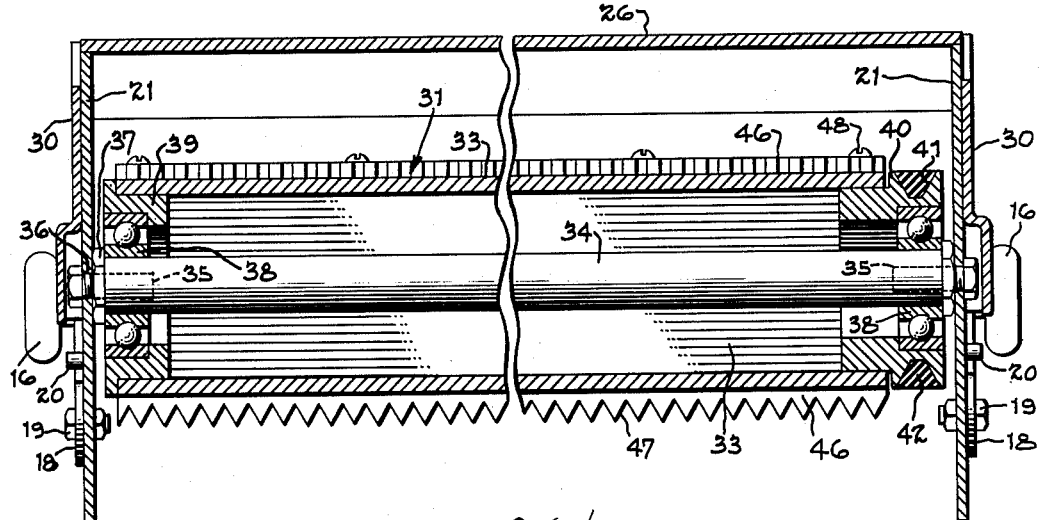
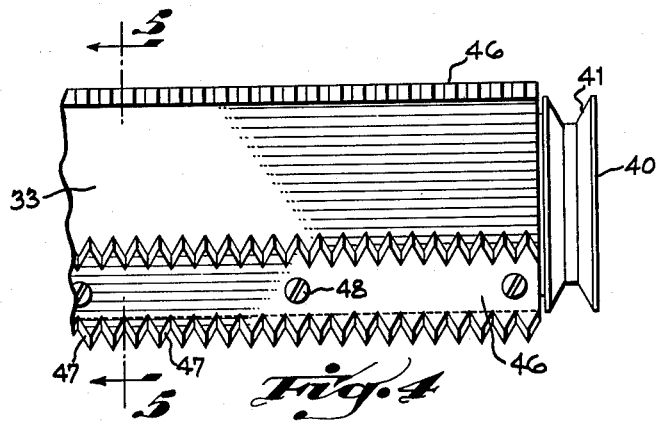
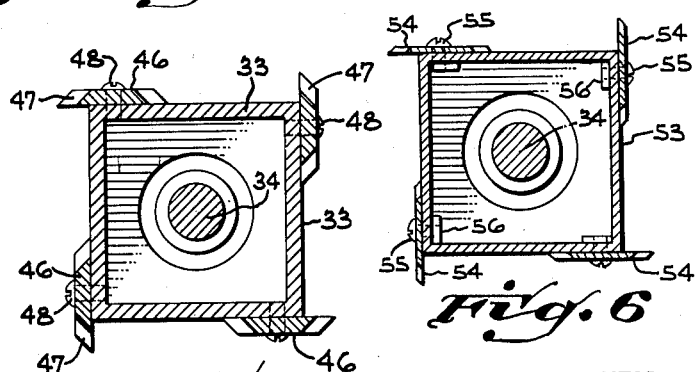
INVENTOR.
Chauncey O. Wood.
BY Wood, Herron & Evans.
ATTORNEYS.

United States Patent Office 2,734,328
Patented Feb. 14, 1956

2,734,328

LAWN MOWER

Chauncey O. Wood, Mason, Ohio

Application March 10, 1953, Serial No. 341,465

7 Claims. (Cl. 56—26)

This invention relates to a lawn mower having novel cutter means arranged to rotate about a horizontally disposed axis.

Unlike the well known reel type mower, the cutting means of the present invention does not require a cutter bar. Grass and weeds are cut by a plurality of blades mounted upon a rotor which is driven at a substantially high rate of speed. The shape and construction of this rotor is one of the novel features of the invention. In the preferred embodiment, the rotor consists of a horizontally disposed member having a plurality of flat sides which are arranged symmetrically about the axis of rotation of the rotor. A cutter blade is mounted upon each of the flat sides of the rotor in position to overhang the adjacent flat side thereof in the direction of rotation. The combination of the overhanging cutter blades and the flat sides of the rotor provides a fan or suction effect which raises the leaves of such plants as dandelions, and plantain weeds into the path of the cutter so that they are trimmed off with the grass. Ordinary reel type lawn mowers pass over plants of this nature so that they must be cut or removed by hand. The fan effect provided also has the advantage that it forcibly throws cuttings to the rear of the rotor. In the preferred embodiment of the invention, a skirt is provided which depends into the path of such cuttings, causing them to be caught and to be distributed evenly over the ground to enrich the soil.

The rotor of the present invention also may be used in conjunction with a novel stationary cutter which is disposed to the rear and above the axis of rotation of the rotor, where it is effective to cut weeds and other tall plants. The stationary cutter is not engaged by the cutter blades on the rotor but is spaced outwardly from them in position to present a cutting edge toward oncoming blades. There is no wear, therefore, from metal to metal contact as in the case of the ordinary reel and cutter bar type mower.

Another feature of the invention resides in the construction of the cutter blades used in combination with the rotor. I have found that these blades may be made of substantially thin, narrow strips of metal having saw tooth cutting edges on both sides. Only one side is used at a time and means is provided for removably mounting the blades on the rotor so that they may be reversed after becoming worn to double their useful life.

Other features of the invention will be apparent from the following detailed description of the drawings in which:

Figure 3 is an enlarged cross sectional view taken on the line 3—3 of Figure 2.

Figure 4 is an elevational view of the right hand portion of the rotor shown in Figure 3.

Figure 5 is a cross sectional view taken on the line 5—5 of Figure 4.

Figure 6 is a cross sectional view similar to Figure 5 showing a preferred rotor and blade construction.

Figure 1:
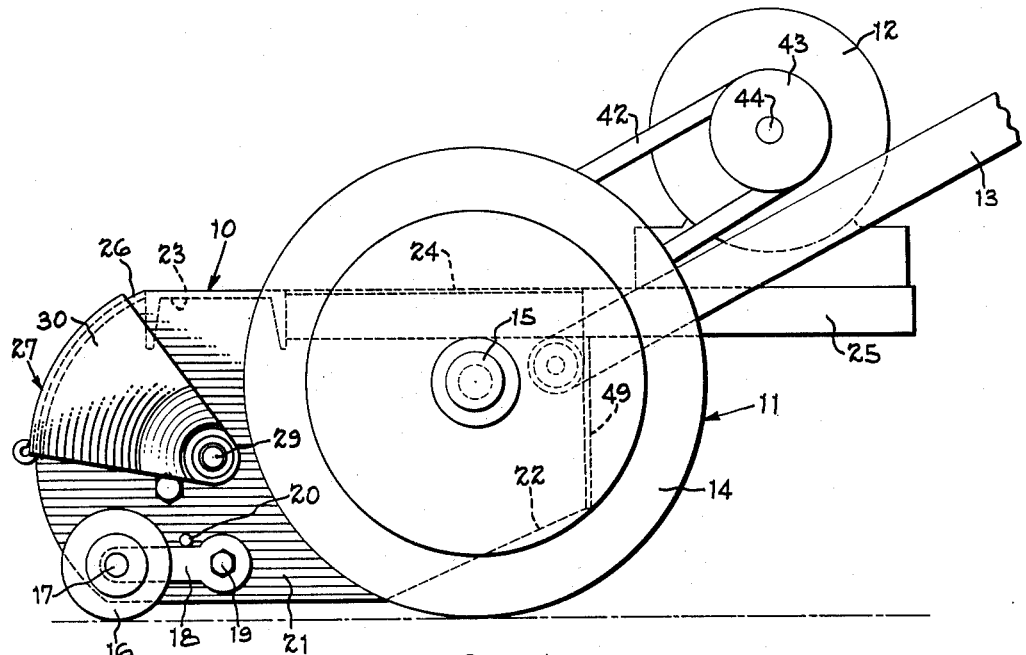
Figure 1 is a side elevational view of a lawn mower embodying the principles of the present invention.

The lawn mower shown in the drawings consists of a carriage 10 which mounts a pair of wheels 11 and a motor 12. In the instance shown, the wheels 11 are not motor driven and thus the mower is pushed by a handle such as the one shown fragmentarily at 13. An electrical motor is shown in the drawings for driving the cutter means of the mower, however, it will be obvious that a gasoline engine or other power means may be employed. In this respect, the electrical motor 12 is to represent any source of power.

The wheels 11 may be substantially the same size as conventional lawn mower wheels and a rubber tread 14 may be provided. Each wheel 11 (only one being shown) is rotatably journalled upon a stub axle such as that shown at 15 which extends outwardly from the side of carriage 10. In addition to wheels 11, which support substantially all of the weight of the mower, a pair of guide rollers 16 are provided at the front of carriage 10. Each of these rollers is journalled upon a stub shaft 17 which is mounted on a bracket 18 pivotally journalled to the carriage. As will be seen in Figure 1, each of the rollers 16 rides ahead of a bolt such as the one shown at 19 which secures bracket 18 to the carriage. A stop 20 is provided for limiting the upward movement of the rollers in order to prevent the front of the carriage from hitting the ground. The positions of rollers 16 relative to the front of the carriage determine the height of the rotating cutter element of this invention, to be described below. Thus, means may be provided for adjusting the position of stop 20 upon the carriage. A series of holes in the carriage to receive the stop may serve this purpose.

Figure 2:
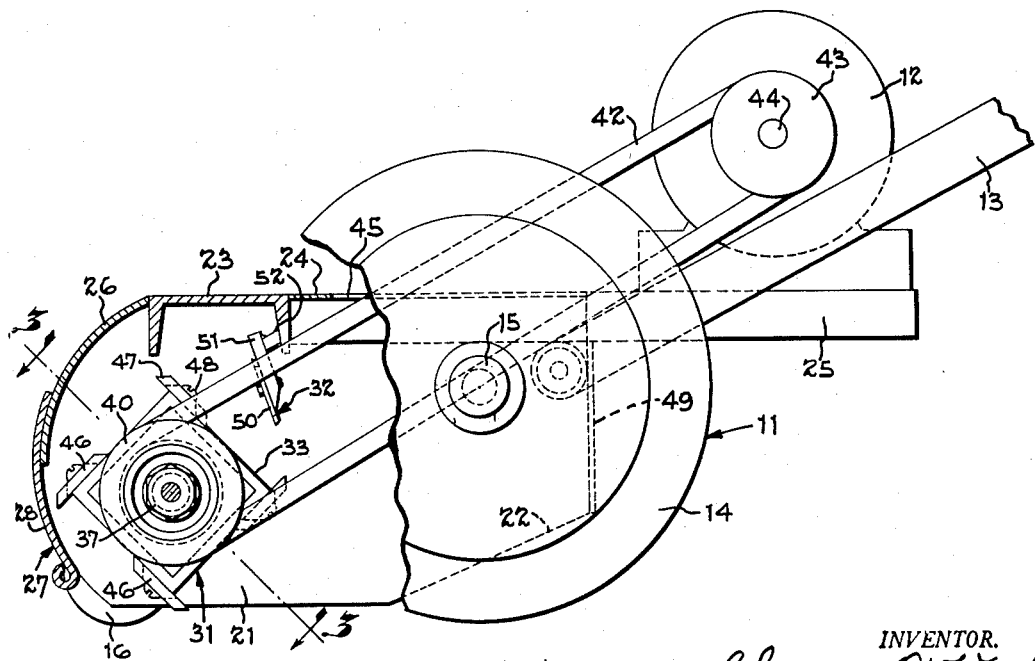
Figure 2 is a view similar to Figure 1 in which the front portion of the mower is broken away to show the cutting means of the invention.

The carriage includes a pair of substantially identical side walls 21—21 which are rounded at the front as shown in Figure 1 and which are relieved along the lower edge in the rear portion thereof, as shown by the dotted lines 22, so that they will not strike the ground when the front of the mower is raised. In the instance shown, the two side walls 21—21 are joined by a channel piece 23 which extends between them adjacent the front end of the mower. The carriage also includes a top plate or cover 24 which extends to the rear of the wheels 11. The respective sides of the top plate 24 may consist of channel members such as those shown at 25 to serve as a support for the motor 12. It will be noted that the motor is offset to the rear of wheels 11 so that it serves as a counter-balance for the cutter and other parts mounted in the carriage ahead of wheels 11. The front of the carriage may be partially enclosed by a curved plate 26 which joins the side walls 21. Plate 26 may extend substantially to the bottom edges of the side walls, however, it is preferred that a pivoted guard 27 be provided for the lower portion of the front of the mower, the guard being raised as shown in Figure 1 when weeds are being cut, or lowered as shown in Figure 2 when grass is being cut. The front wall of guard 27 is curved on a radius equal to that of wall 26 of the carriage, the respective radii being centered upon the axis of rotatable journals 29 which may comprise stub shafts secured to the respective side walls 21—21 of the carriage. The front wall 28 of the guard may be secured to the journals 29 by webs as those indicated at 30 in Figure 1.

The cutter means of the present invention include a rotor which is indicated generally at 31, and a stationary blade 32. The rotor, in the preferred embodiment, consists of a metal tube 33 which is substantially square in cross section (see Figure 5). The rotor is arranged to rotate about a cross shaft 34 which is co-extensive with the central axis of the tube. Each of the opposite ends of cross shaft 34 is drilled and tapped to receive a bolt 35 which traverses a bore 36 in the side wall 21 of the carriage and threads into the end of the shaft. Each bolt may be locked therein by a lock nut 37 which is threadedly engaged upon the bolt 35 at the inner side of adjacent wall 21. The respective ends of cross shaft 34 may have ball bearings such as those shown at 38 press fitted thereon. The outer race of the ball bearing shown at the left in Figure 3 is seated in a boss 39 which, in turn, is seated with the end of the tube 33. At the right end, as seen in Figure 3, a ball bearing race similar to the one shown at 38 may be employed, however, in this instance, the boss is modified to include a pulley wheel portion 40. Portion 40 includes an annular groove 41 which is designed to receive a V-shaped drive belt 42. This belt is engaged around a pulley 43 which is keyed to drive shaft 44 of motor 12. A slot 45 is provided in top plate 24 to accommodate the pulley.

Means other than the specific ones shown in the drawings may be employed to mount the rotor. In addition, it is not essential to utilize a hollow tubular rotor although this is preferred because it is light, strong, and economically fabricated. Also it may be seen that the cross shaft 34 may be made so that it rotates in journals in the respective side walls 21 of the carriage.

The rotor mounts a plurality of cutter blades 46. Each of these blades is affixed to one of the flat faces of the rotor adjacent an edge thereof to present a cutting edge which overhangs the adjacent face of the rotor in the direction of rotation thereof. Preferably each blade is made of a substantially thin piece of metal having saw toothed cutting edges 47—47 at the opposite sides thereof. The blades may be fastened to the rotor by removable means such as bolts 48 so that each blade may be turned end for end to present one or the other of the cutting edges to grass being cut. This expedient doubles the useful life of the blades.

The rotor should rotate at a substantially high rate of speed so that a smooth grass trimming job results. I have determined that a four inch rotor, rotating at approximately 1000 R. P. M. works satisfactorily at an ordinary walking speed. Higher speeds may be utilized if desired. The combination of the high speed of rotation of the rotor, the flat faces provided between cutter blades, and the overhanging relationship of the cutter blades provides a fan effect which creates a suction underneath the rotor. This lifts flat leafed plants, which ordinarily are missed by reel type lawn mowers, into the path of the blades. Also the rotor forcibly throws cut grass toward the rear. If desired, a grass catcher may be used in connection with the mower, however, the rotor chops grass into small pieces and by placing a skirt as shown at 49 across the rear of the carriage, these pieces are dropped back upon the lawn for mulch. If desired, the skirt may be made of fabric so that it may be lifted out of the way when a grass catcher is being used. The fact that the blades extend parallel with the rotor instead of being curved as in an ordinary reel type mower, causes the cut grass to be distributed evenly in back of the rotor. Thus, it does not tend to gather in objectionable rows on the lawn.

For grass trimming, the rotor may be used alone. Under these conditions the guard 27 may be lowered for safety. The rotor in combination with the stationary cutter 32 is effective for cutting weeds and long grass. The stationary cutter may comprise a blade 50 which is mounted parallel to the axis of rotation of the rotor, but above it and to the rear. In the instance shown, blade 50 is mounted on a cross bar 51 which, in turn, is secured to a depending web 52 of the channel 23 which extends across the top of the carriage. Blade 50 may be affixed to cross bar 51 by bolts and preferably has two cutting edges upon it so that one or the other may be presented to the cutter blades carried by the rotor. It is not necessary that the blade 50 be any closer than from ⅛ to ⅜ of an inch from the path of the rotating blades. For most purposes, ¼ of an inch clearance operates satisfactorily. As shown in Figure 2, the cutting edge of blade 50 is presented toward the path of rotation of the cutter blades on the rotor at a slight angle to a plane tangent to the path. The exact relative disposition of blade 50 is not critical, however, it should not vary substantially from the relationship shown. When the mower is being used for cutting weeds the rotor first severs them. The blade 50 serves as a means of cutting them into smaller pieces and preventing long weeds from becoming wrapped around the rotor and covering the cutting edges of the blades.

Figure 6 shows the preferred construction of the rotor. It will be noted that the tubular member, which is indicated at 53 in this instance, consists of sheet metal which is configured into the square or block shape previously discussed. The sheet metal may be substantially 5/32 inches thick. The blades which are indicated at 54 in this figure are also fabricated from substantially thin sheet metal, preferably carbon steel approximately 1/16 inch thick. The blades are secured to the tubular member 54 by bolts 55. To provide adequate anchorage for the bolts, tabs such as those shown at 56 may be secured to the inner wall of the tube, the wall and tab being drilled and tapped to receive the bolts. The use of thin metal blades 54 makes it economically practical to discard and replace blades after the cutting edges have become dulled. The same type of blade may be used for the stationary cutter 32.

Having described my invention, I claim:

1. In a lawn mowing and weed cutting machine, a substantially flat sided rotor, means to mount said rotor for rotation about a horizontal axis, means to drive said rotor at a substantially high rate of speed, a cutter blade overhanging each of the sides of said rotor in the direction of rotation thereof the respective cutter blades being disposed symmetrically around the axis of rotation of said rotor and being immovably fixed on the rotor, and a member having a cutting edge thereon disposed above said axis and just outside of the path of said cutter blades, said member disposed so as to present said cutting edge toward oncoming cutter blades.

2. In a power driven mower, the combination of a rotatable cutter member and a stationary cutter member, said rotatable cutter member comprising a horizontally disposed rotor adapted to rotate about its longitudinal axis, said rotor being substantially square in cross section to provide four edges which are parallel with said longitudinal axis, a cutter blade fixedly mounted upon said rotor at each of said edges and arranged to overhang said edge in the direction of rotation of said rotor, said stationary cutter member comprising a cutter blade mounted parallel with the longitudinal axis of said rotor above and behind said axis and just outside of the path of the cutter blades mounted on said rotor.

3. In a power driven mower for trimming grass and cutting weeds the combination of a rotatable cutter and a stationary cutter, said rotatable cutter comprising a tube having a plurality of flat sides meeting at edges which are parallel to the longitudinal axis of said tube and which are spaced symmetrically with respect to said axis, a cutter blade fixedly mounted upon said tube at each of said edges, each cutter blade overhanging an edge in the direction of rotation of said tube, said tube being mounted horizontally and spaced a distance from the ground to bring the cutter blades mounted thereon successively into grass trimming position upon rotation thereof, and said stationary cutter comprising a weed cutter blade mounted above and to the rear of the longitudinal axis of said tube and arranged to present an edge toward oncoming cutter blades mounted on said tube.

4. In a power driven mower, cutting means comprising a rotor adapted to rotate about a horizontally disposed axis, said rotor having a plurality of substantially flat sides which meet at edges symmetrically spaced about said axis, means to drive said rotor at a substantially high rate of speed, a plurality of saw-tooth edged cutter blades, said blades being one more in number than the number of said edges, said cutter blades fixedly mounted on said rotor to overhang each of said edges in the direction of rotation of said rotor, and a cutter blade disposed above and to the rear of said axis and just outside of the path of the blades mounted upon the rotor with said saw-toothed edge toward oncoming cutter blades mounted on said rotor.

5. A lawn mower comprising a wheeled carriage, a tubular cutter member journalled in said carriage for rotation about a horizontal axis which extends transversely of said carriage, said tubular member being square in lateral cross section to provide four flat sides, a blade fixedly mounted on each of the four sides of said member, each blade presenting a cutting edge overhanging the adjacent side of said member in the direction of rotation thereof, the axis of rotation of said member being elevated above the ground such that the blades are disposed at grass trimming height relative thereto, and means to drive said tubular member at a substantially high rate of speed, whereby the blades mounted thereon are adapted to cut and thereby trim grass beneath the member independently of a stationary cutter bar or other means adapted to coact with said blades.

6. A lawn mower adapted to trim grass by means of a high speed rotary element independently of a stationary cutter bar or other means adapted to coact with said element, said lawn mower comprising a wheeled carriage, a tube, said tube being square in lateral cross section to provide four flat sides, said tube journalled in said carriage for rotation about a horizontal axis which extends transversely of the direction of forward movement of said wheeled carriage, means to rotate said tube at a substantially high rate of speed, and a blade fixedly mounted on each of the four sides of said tube, each blade overhanging the adjacent side of said tube in the direction of rotation thereof.

7. A lawn mower adapted to trim grass by means of a high speed rotary element independently of a stationary cutter bar or other means adapted to coact with said element, said lawn mower comprising a wheeled carriage, an elongated tubular member, means to journal said elongated tubular member for rotation about its longitudinal central axis with said axis disposed substantially horizontally and transversely of the direction of forward movement of said carriage, said tubular member having a plurality of substantially flat sides meeting at edges which are symmetrically disposed and equally spaced with respect to the longitudinal axis of said member, a saw toothed edged blade fixedly mounted upon said member at each of said edges and overhanging the adjacent flat side thereof in the direction of rotation of said member to expose said saw tooth edge, and means to rotate said member about its longitudinal central axis at a high rate of speed.

References Cited in the file of this patent

UNITED STATES PATENTS

| Number | Name | Date |
|---|---|---|
| 212,626 | Sayre | Feb. 25, 1879 |
| 1,429,163 | Peden | Sept. 12, 1922 |
| 2,016,987 | Cheadle | Oct. 8, 1935 |
| 2,236,612 | Stoner | Apr. 1, 1941 |
| 2,434,124 | Schaaf et al. | Jan. 6, 1948 |
| 2,486,969 | Nelson | Nov. 1, 1949 |
| 2,633,687 | Bannister | Apr. 7, 1953 |
| 2,644,501 | Perry | July 7, 1953 |
| 2,669,083 | Hinsen | Feb. 16, 1954 |
| 2,674,081 | Hansen | Apr. 6, 1954 |